(12) United States Patent
Merritt et al.

(10) Patent No.: US 8,418,495 B2
(45) Date of Patent: Apr. 16, 2013

(54) AIR CYCLE MACHINE INTEGRATED ROTOR AND SHAFT

(75) Inventors: Brent J. Merritt, Southwick, MA (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1761 days.

(21) Appl. No.: 11/230,842

(22) Filed: Sep. 20, 2005

(65) Prior Publication Data

US 2006/0059943 A1  Mar. 23, 2006

Related U.S. Application Data

(63) Continuation of application No. 10/980,045, filed on Nov. 3, 2004, now Pat. No. 8,347, 647.

(60) Provisional application No. 60/611,941, filed on Sep. 22, 2004.

(51) Int. Cl.
F25D 9/00 (2006.01)

(52) U.S. Cl.
USPC .............. 62/402; 62/88; 62/401; 62/6; 62/87; 60/796; 60/797; 60/798; 60/799; 60/805; 417/407; 415/216.1; 416/204 R; 416/204 A; 416/244 A; 416/244 R

(58) Field of Classification Search .............. 62/88, 402, 62/401, 6, 87, 38; 60/796–799, 805; 417/407; 415/216.1; 416/204 R, 204 A, 244 A, 244 R
See application file for complete search history.

(56) References Cited

U.S. PATENT DOCUMENTS

| | | | | |
|---|---|---|---|---|
| 2,626,501 | A | * | 1/1953 | Pavlecka et al. ............. 60/39.15 |
| 4,949,821 | A | * | 8/1990 | Murota et al. ................ 192/3.21 |
| 4,967,565 | A | * | 11/1990 | Thomson et al. ................. 62/57 |
| 5,014,518 | A | * | 5/1991 | Thomson et al. ................. 62/88 |
| 5,086,622 | A | | 2/1992 | Warner |
| 5,125,597 | A | | 6/1992 | Coffinberry |
| 5,143,329 | A | | 9/1992 | Coffinberry |
| 5,442,905 | A | | 8/1995 | Claeys et al. |
| 5,704,218 | A | | 1/1998 | Christians et al. |
| 5,887,445 | A | | 3/1999 | Murry et al. |
| 6,151,909 | A | * | 11/2000 | Carter et al. .................... 62/402 |
| 6,305,156 | B1 | | 10/2001 | Lui |
| 6,457,318 | B1 | | 10/2002 | Lui et al. |
| 6,481,917 | B1 | * | 11/2002 | Chen et al. ................. 403/374.3 |
| 6,615,606 | B2 | | 9/2003 | Zywiak |

OTHER PUBLICATIONS

Search Report PCT/US2005/033924.

* cited by examiner

*Primary Examiner* — Frantz Jules
*Assistant Examiner* — Azim Abdur Rahim
(74) *Attorney, Agent, or Firm* — Carlson, Gaskey & Olds PC

(57) ABSTRACT

An air cycle machine includes two turbines and a compressor mounted on an integral shaft. The integral shaft includes a plurality of shaft sections that are welded together and machined in a single set-up process into a desired shaft shape to provide highly aligned bearing surfaces. The shaft includes three stops that cooperate with three fasteners to secure the two turbines and the compressor on the shaft.

21 Claims, 4 Drawing Sheets

AIR CYCLE MACHINE INTEGRATED ROTOR AND SHAFT

REFERENCE TO RELATED APPLICATIONS

This application is a continuation of application Ser. No. 10/980,045, filed Nov. 3, 2004, now U.S. Pat. No. 8,347,647, which claims the benefit of U.S. Provisional Patent Application No. 60/611,941, filed Sep. 22, 2004.

BACKGROUND OF THE INVENTION

The present invention relates to environmental control systems (ECSs), and more particularly to an air cycle machine (ACM) configuration.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages. Interaction between the air and liquid subsystems is relatively complex. Moreover, airflow sequencing, particularly for multi-turbine air cycle machines (ACMs), radically affects ECS efficiency. In many instances much thermal energy may be wasted or otherwise inefficiently used.

In one conventional system, a flow of bleed air is taken from an intermediate or high pressure stage within a jet engine. The bleed air is pre-cooled within an air-to-air heat exchanger with heat being rejected to RAM air and then flowed to a compressor of the ACM. After compression, the air is routed through a second air-to-air heat exchanger, a regenerative heat exchanger and an air-to-air reheater heat exchanger. Condensed water vapor is extracted by a water extractor, and dehumidified air is routed to a turbine. Expanded air from the turbine flows through another water collector and into a liquid-to-air heat exchanger of the liquid loop. A relatively warmer liquid in the liquid loop which is used to cool the avionics is thereby cooled. From the liquid-to-air heat exchanger, the air passes through the reheater heat exchanger. The dehumidified air is then passed into a second turbine of the ACM where it is again expanded and passed through another liquid-to-air heat exchanger to further absorb heat from the liquid loop.

The ACM is an integral part of the ECS. Conventional ACM's include at least two turbines and a compressor mounted along a common axis. The turbines and compressor are assembled using multiple shaft pieces and held together with a tie rod assembly. For example, the compressor may be mounted as a link between two shaft pieces. Typically, each shaft piece is machined to a desired tolerance in a separate operation and later assembled to the other pieces. Disadvantageously, the tolerances from each component compound in assembly. This often results in misalignment of journal bearing portions of the ACM and leads to undesirable shaft loads, vibration, and imbalance during ACM operation. Furthermore, conventional assemblies often require complex and heavy components to hold the shaft pieces, turbines, and compressor together, such as tie rods and robust static structures.

Accordingly, it is desirable to provide a simplified integral ACM rotor assembly that minimizes rotational loads.

SUMMARY OF THE INVENTION

The ACM according to the present invention includes two turbines and a compressor mounted to an integral shaft. The shaft includes shaft sections that are welded together and machined in a single set-up process into a desired shaft shape to provide highly aligned bearing surfaces. The shaft includes three stops and three threaded fasteners that secure the two turbines and the compressor to the shaft.

The present invention therefore provides a simplified assembly that includes highly aligned bearing surfaces to minimize rotational loads.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
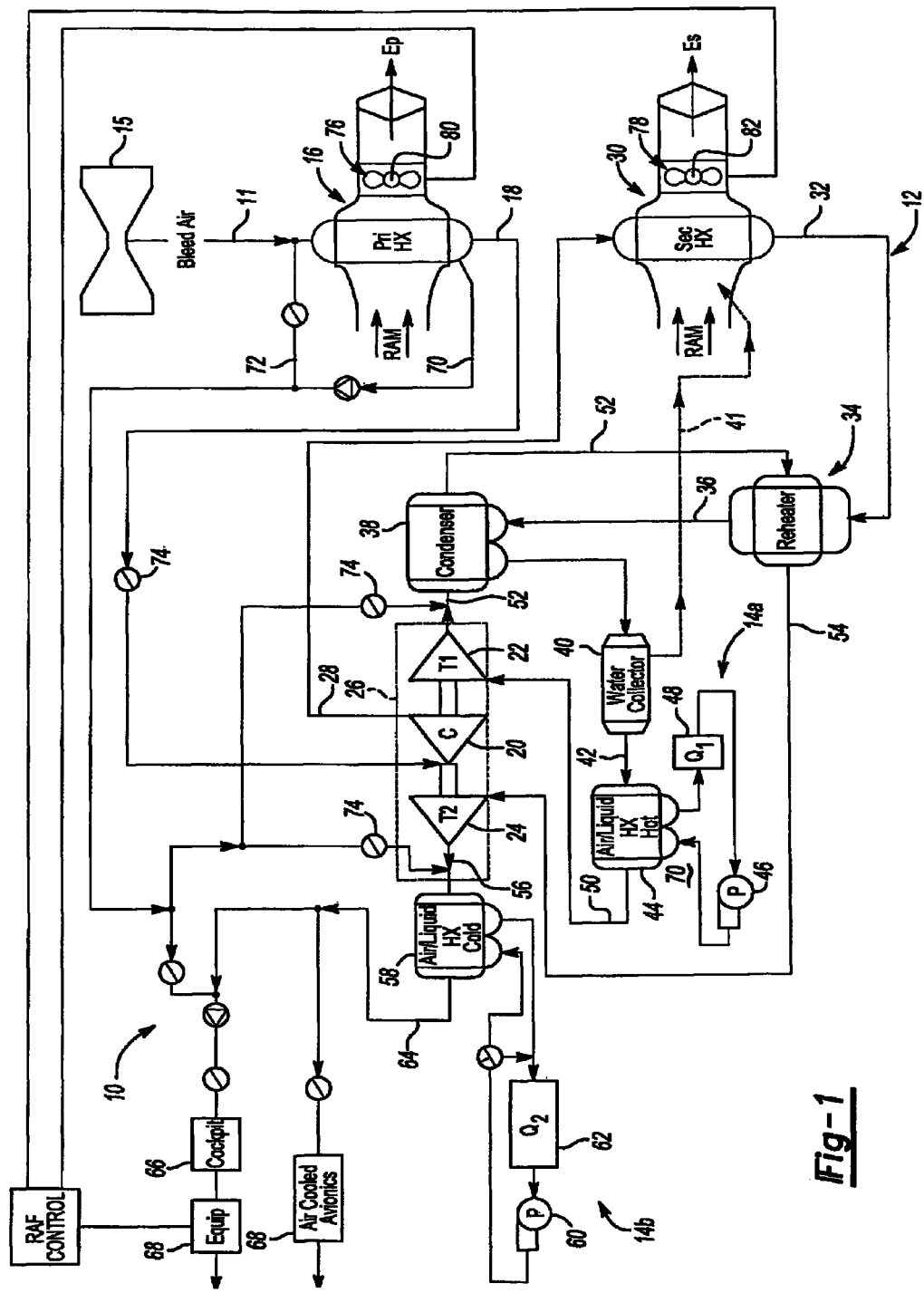
FIG. 1 is a schematic representation of environmental control system according to the present invention.

FIG. 1 illustrates a general schematic view of a liquid-to-air cycle system or environmental control system (ECS) 10. The ECS 10 includes an air cycle subsystem 12 that is in a heat exchange relationship with a liquid cycle subsystem 14a, 14b. It should be understood that although two separate liquid subsystems are disclosed in the illustrative embodiment, a single substantially continuous subsystem will also benefit from the present invention.

Bleed air 11 is preferably received from a gas turbine engine (illustrated schematically at 15). The bleed air 11 is sent through a primary heat exchanger 16 such that the bleed air 11 is in heat exchange relationship with RAM or ambient air. The primary heat exchanger 16 is preferably an air-to-air exchanger. After the bleed air 11 is cooled in the primary heat exchanger 16, the resulting cooler air is communicated through a passage 18 which communicates with a compressor 20 where the air is compressed to a high pressure. The compressor 20 is preferably located upon a common shaft with a first turbine 22 and a second turbine 24. The compressor 20 and turbines 22, 24 define an air cycle machine (ACM) 26.

Compressed air exits the compressor 20 through a passage 28 which communicates with a secondary heat exchanger 30. The secondary heat exchanger 30 is preferably an air-to-air exchanger which further cools the compressed air by heat exchange with a RAM air flow. Compressed, cooled and water vapor bearing air exits the secondary heat exchanger 30 and flows through a duct 32 which communicates with a reheater 34.

The reheater 34 further cools the water vapor bearing air which exits the reheater 34 through a passage 36. Passage 36 communicates with a condenser 38 which further cools the water vapor bearing air by condensing and separating the water into a water extractor 40. As the water vapor bearing air is passed directly from the reheater 34 to the condenser 38, the water from the water vapor condenses relatively easily.

Dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, moisture which may remain in the air is removed as the temperature of the air is increased by passage through the first air-liquid heat exchanger 44.

The liquid cycle subsystem 14a, is preferably a closed system and utilizes a liquid coolant, such as polyalphaolephin (PAO) which is cycled by a pump 46 or the like. The liquid coolant functions as a coolant medium for a heat load 48 and as a heat source for the dehumidified air which is passing through passage 42. The heat load 48 is typically an avionics subsystem which generates a rather large amount of heat— typically around 160 degrees Fahrenheit. The heat exchange process therein between the liquid coolant in the liquid cycle subsystem 14a and the air communicated through passage 42 cools the liquid removes heat from the load 48 and heats the air exiting the first air-liquid heat exchanger 44.

Dehumidified heated air exits the first air-liquid heat exchanger 44 through a passage 50 which communicates with the first turbine 22. The air is expanded through the first turbine of the ACM 26 between an inlet pressure of the first turbine 22 and an outlet pressure of the second turbine 24. The first turbine 22 also assists in condensing any water vapor which may still be in the air as a result of the air being expanded and thus cooled.

The recovered heat from the first air-liquid heat exchanger 44 is used by the first turbine 22, for example, to increase its rotating speed, boost its pressure ratio, increase its power and increase the expansion of the reheated air. Further, the first turbine 22 is mechanically engaged to the compressor 20 and the second turbine 24. Thus, heat or energy absorbed by the first turbine 22 is further converted to useful energy by the compressor 20.

The discharge pressure from the first turbine 22 is maintained at a discharge temperature just above freezing (mid-pressure) so that the first turbine 22 outlet air which passes through a passage 52 operates as a heat sink for the condenser 38 and the reheater 34. That Heated air exits the reheater 34 through a passage 54 which communicates with the second turbine 24. The recovered heat from the condenser 38 and the reheater 34 is used by the second turbine 24, for example, to increase its rotating speed, boost its pressure ratio, increase its power and increase the expansion of the reheated air. Thus, the performance of both turbines 22, 24 is improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 is preferably maintained at a discharge temperature just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14b to form a heat exchange relationship therebetween.

The liquid cycle subsystem 14b, is preferably a closed system as described above. The liquid coolant of the liquid cycle subsystem 14b is cycled by a pump 60 and functions as a coolant medium for a second heat load 62. An operating temperature of the second heat load 62 is preferably lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14b and the air communicated through passage 56 cools the liquid, removes heat from the load 62 and heats the air exiting the second air-liquid heat exchanger 58. The relatively warmer air exits second air-liquid heat exchanger 58 through a passage 64 which communicates with cockpit 66 and/or other air loads 68 to provide cooling air therefor.

In the event that it is desired to modulate the supply from the first turbine 22, second turbine 24, cockpit 66 and/or the air loads 68, a temperature control passage 70, 72 communicates directly with bleed air 11 prior and/or subsequent to the primary heat exchanger 16. Control valves 74 are preferably located just downstream of the first turbine 22 and the second turbine 24, and just upstream of the cockpit 66 and/or the air loads 68 to allow warm air mixture therewith. Operation of such control valves may be implemented by a microprocessor based electronic control system (either digital or analog; not shown).

The primary heat exchanger 16 and the secondary heat exchanger 30 preferably include a respective primary RAM air fan (RAF) system 76 and a secondary RAM air fan (RAF) system 78. Notably, the RAFs 76,78 are located downstream of the respective heat exchangers 16, 30 in the RAM exhaust (illustrated schematically by arrows Ep, Es) such that temperature rise across the RAFs 76, 78 will not effect ECS performance. Each RAF 76, 78 includes an electric motor 80,82 such that each RAF 76, 78 is driven at a speed independent of the ACM 26 which reduces generated noise and increases overall operating efficiency. Furthermore, as each RAF 76, 78 is driven by the independent RAF electric motors 80, 82 the RAF 76, 78 are preferably installed in the ECS systems 10 as self contained systems such as Line Replaceable Units (LRUs) which simplifies maintenance, improves reliability and performance while decreasing system weight.

Figure 2:
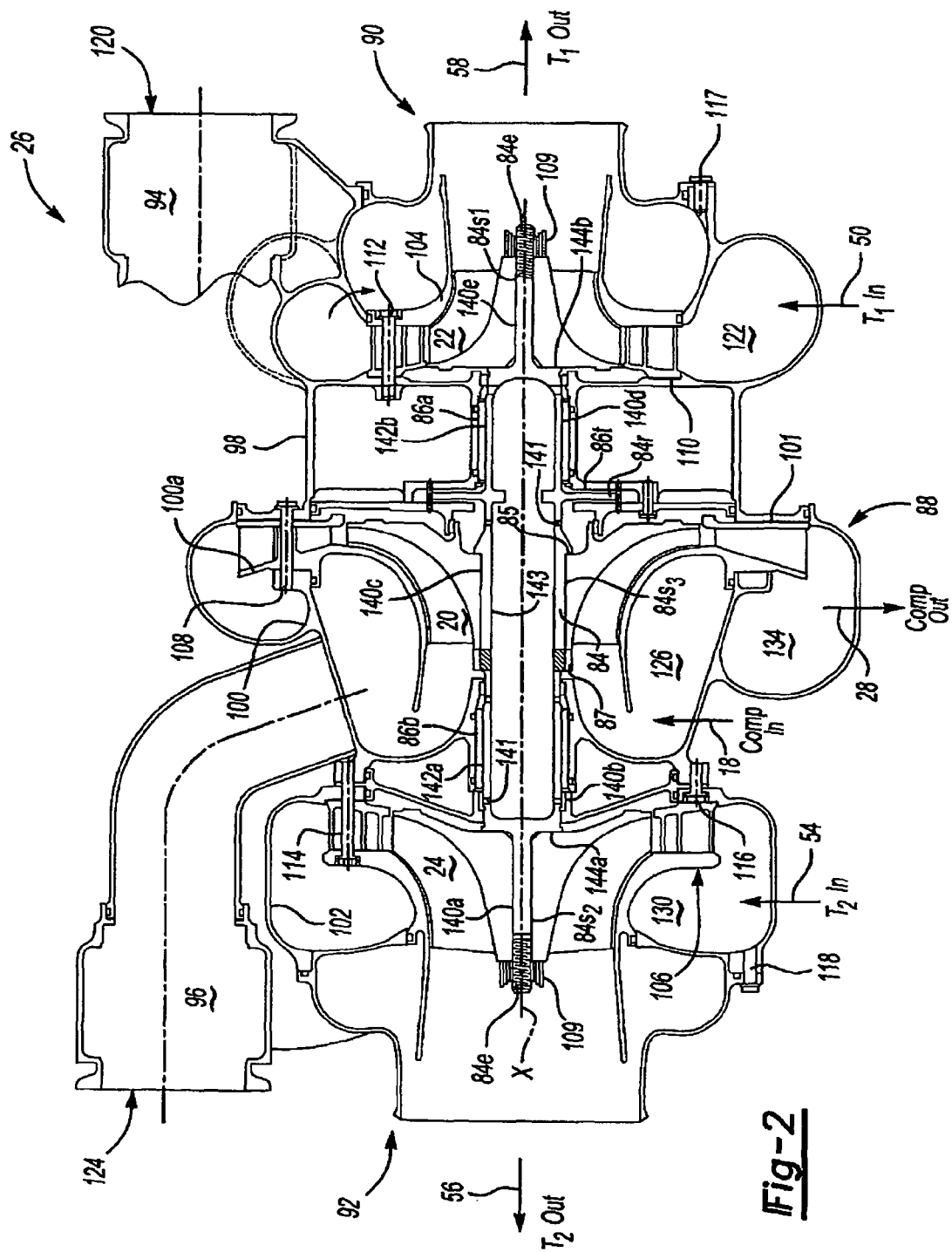
FIG. 2 is a sectional view of an ACM.
Figure 3:
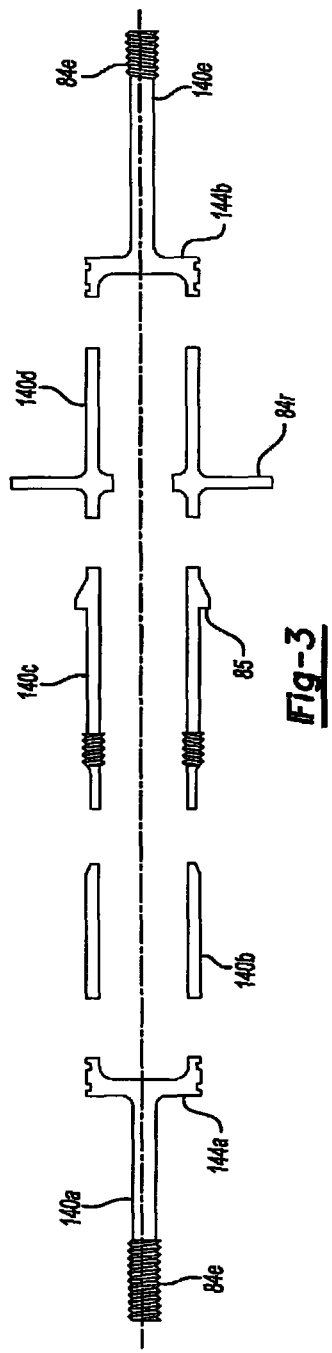
FIG. 3 is an exploded view of an ACM shaft.

Referring to FIG. 2, the ACM 26 locates the compressor 20 upon common shaft 84 between the first turbine 22 and the second turbine 24 for rotation about an axis of rotation X. The shaft 84 is made from a plurality of welded together sections 140a, 140b, 140c, 140d, and 140e that form an internal cavity 143, which reduces the weight of the shaft 84. FIG. 3 shows an exploded view of the sections 140a, 140b, 140c, 140d, and 140e at the weld joints 141. It is to be understood that although a specific number of sections is shown, fewer or additional sections may be used as desired to shorten or lengthen the shaft 84 for example.

Figure 4:
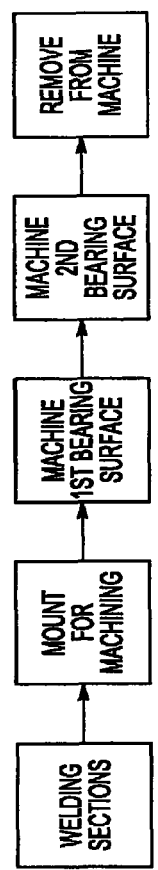
FIG. 4 shows steps of making an ACM shaft.

FIG. 4 shows steps of making the shaft 84, including welding the sections 140a, 140b, 140c, 140d, and 140e together using a known rotational welding or electron beam welding process. The sections 140a, 140b, 140c, 140d, and 140e are then mounted in a machine, such as a lathe, to form the illustrated shaft 84 shape. Material is removed from portions of the shaft 84 to form journal bearing surfaces 142a and 142b with a desired tolerance. Utilizing a shaft 84 made from sections 140a, 140b, 140c, 140d, and 140e allows the journal bearing surfaces 142a and 142b to be machined in a single set-up. That is, the shaft 84 is mounted for machining and both the journal bearing surfaces 142a and 142b are machined without removing and remounting the shaft 84 in the machine. This provides the benefit of machining the journal bearing surfaces 142a and 142b with a tight tolerance relative to each other rather than relative to an arbitrary point of reference, which is one drawback of the prior art. This minimizes shaft 84 loads and aligns the hydrodynamic foil bearings 86a and 86b (FIG. 2) that support the shaft 84. Reduction of shaft 84 loads due to imbalance may also increase the ACM's performance and reliability.

The shaft 84 is supported on hydrodynamic foil bearings 86a, 86b, 86t which are reacted by an ACM housing 88.

Locating the turbines 22, 24 outboard on each end of the ACM 26 is achieved by removing the RAFs 76, 78 from the ACM 26 and locating the RAFs 76, 78 elsewhere in the ECS system 10 (FIG. 1). Also, as the compressor 20 is located between the turbines 22, 24, the bypass circuits 94, 96 which communicate with the turbines 22, 24 are less circuitous and thereby more efficient.

This use of the outboard-located turbines 22, 24 results in the highest efficiency possible with each turbine using a straight axial outlet diffuser 90, 92. Applicant has obtained flange-to-flange turbine efficiencies for a relatively large outboard-located axial-discharge turbine of up to 90 percent. The ACM 26 disclosed in the present invention provides twice the benefit resulting in better performance and overall lower system weight.

The ACM housing assembly 88 is manufactured of a multiple of housing portions to provide a desired clearance for the compressor 20 and the turbines 22, 24. Preferably, the ACM housing assembly 88 includes a first turbine housing portion 98, a compressor housing portion 100, a second turbine housing portion 102, a first turbine outlet portion 104 and a second turbine outlet 106 portion (also illustrated in FIG. 5).

A multiple of first turbine portion fasteners 108 (one shown) attaches the first turbine housing portion 98 to the compressor housing 100. An annular compressor shim 101 positions the first turbine housing portion 98 relative to the compressor housing 100 to provide a desired clearance for the compressor 20 and accommodate manufacturing variations in the housing portions 98, 100. The first turbine portion fasteners 108 threads through an inner compressor housing portion 100a which closely mates with the compressor 20.

The hydrodynamic foil bearing 86a supports the shaft 84 within the first turbine housing portion 98. The hydrodynamic foil bearing 86b supports the shaft 84 within the compressor housing portion 100. A hydrodynamic foil thrust bearing 86t is located between a radially extending shaft flange portion 84r which extends radially between the first turbine housing portion 98 and the compressor housing portion 100.

Threaded fasteners 109 attach to threaded shaft ends 84e to secure the turbines 22, 24 through a respective splined interface 84s1, 84s2 and against respective stops 144a and 144b formed on the shaft 84. A torque wrench may be used to tighten the threaded fasteners 109 to a desired turbine preload. The compressor 20 engages the shaft 84 through a splined interface 84s3 and is axially retained adjacent a shaft stop 85 and a lock ring 87, such as a threaded fastener. The stops 144a, 144b, and 85 in combination with the corresponding threaded fasteners 109 and lock ring 87 provide the advantage of eliminating shaft tie rods that may add complexity and weight to an ACM, which is a drawback of the prior art. Further, the above assembly reduces assembly time by minimizing balance-correction operations.

An annular first turbine outlet shim 110 and a multiple of first turbine outlet fasteners 112 (one shown) positions the first turbine outlet portion 104 relative to the first turbine 22 to provide a desired clearance and accommodate variations in the housing portions 98, 104. The diffuser outlet 90 is mounted to the first turbine outlet portion 104 with a multiple of first turbine diffuser fasteners 117.

A multiple of second turbine portion fasteners 114 (one shown) attaches the second turbine housing portion 102 to the compressor housing 100. An annular shim 116 positions the second turbine outlet portion 106 relative to the second turbine 24 to provide a desired clearance and accommodate variations in the housing portions 106, 100. The fasteners 108, 114 are preferably threaded into the compressor housing portion 100. The second turbine diffuser outlet 92 is attached to the second turbine outlet portion 106 with a multiple of second turbine outlet fasteners 118.

Figure 5:
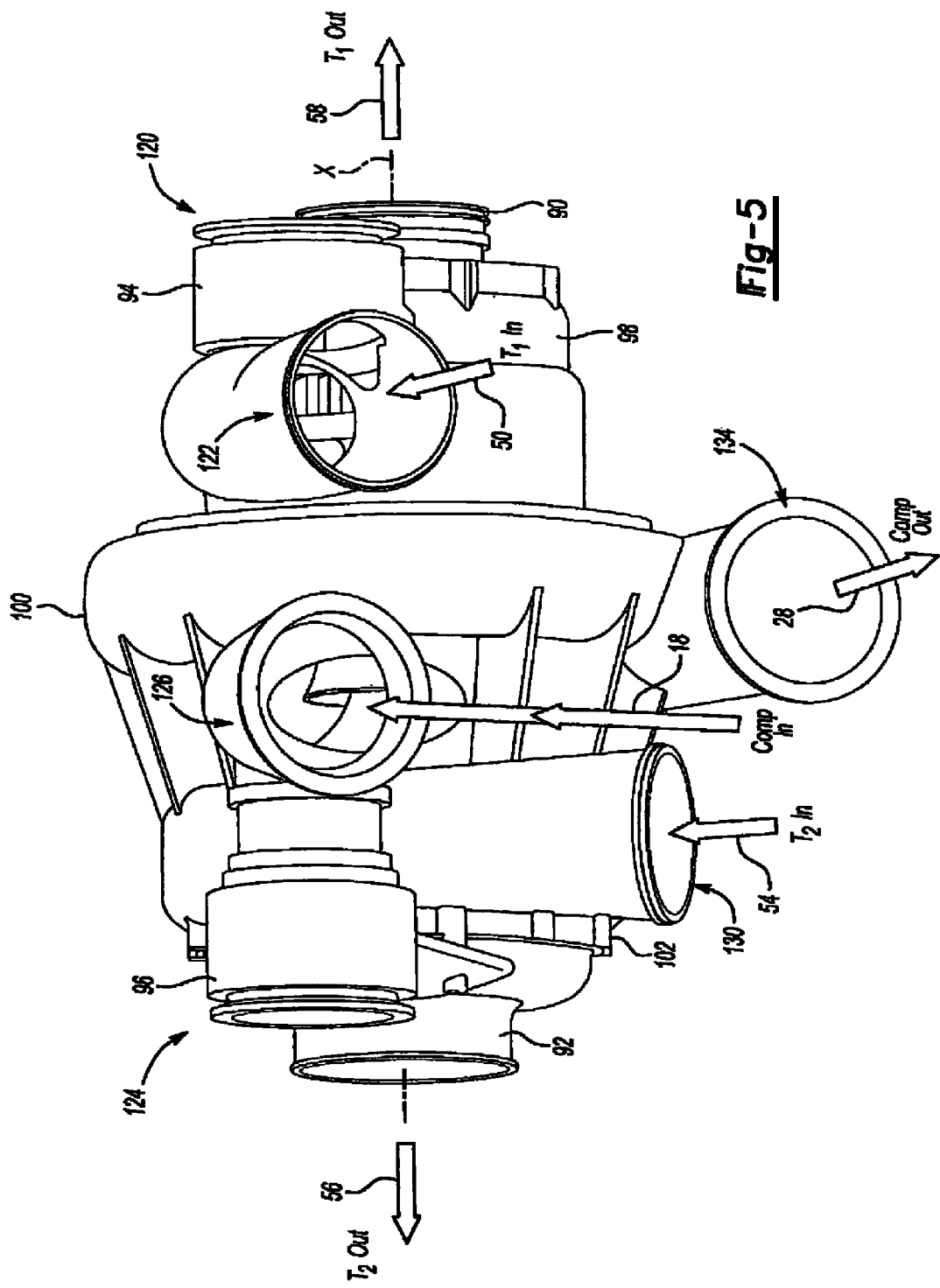
FIG. 5 is a perspective view of an ACM.

Referring to FIG. 5, a low limit bypass valve port 120 directly communicates with a first turbine inlet 122. An auxiliary ground unit (AGU) bypass valve port 124 directly communicates with a compressor inlet 126. By combining the integral valve ports into the ACM 26 with the simplified bypass circuits, a lightweight, high efficiency design is obtained.

The first turbine inlet 122, a second turbine inlet 130 and the compressor inlet 126 are at least partially wound around the ACM axis X. That is, the first turbine inlet 122, the second turbine inlet 130 and the compressor inlet 126 are formed into the respective housing portions to smoothly direct airflow in a tangential path toward the respective first turbine 22, the second turbine 24 and the compressor 20 (also illustrated in FIG. 2). A compressor outlet 134 also extends at least partially around the compressor housing portion to smoothly direct airflow out of the compressor 20 in a tangential direction. The compressor inlet 126 and the compressor outlet 134 are preferably directed in a common direction to provide for a compact ACM packaging arrangement. The addition of integral valve ports into the ACM 26 hosing portions also results in a weight reduced design due to increase bypass efficiencies and simplified installations.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air cycle machine (ACM) comprising:
   a shaft including a first shaft section having a first shaft section diameter, wherein the first shaft section comprises a first stop segment having a first axially facing surface, the first stop segment being connected to a second shaft section having a second shaft section diameter that is larger than the first shaft section diameter; and
   a first turbine mounted on said first shaft section adjacent said first axially facing surface.

2. The ACM as recited in claim 1, wherein said shaft includes a third shaft section having a third shaft section diameter, wherein the third shaft section comprises a second stop segment having a second axially facing surface, the second stop segment being connected to a fourth shaft section having a fourth shaft section diameter that is larger than the third shaft section diameter.

3. The ACM as recited in claim 2, wherein said first axially facing surface faces in an opposite direction from said second axially facing surface.

4. The ACM as recited in claim 2, wherein each of said first shaft section and said third shaft section each include a threaded end portion.

5. The ACM as recited in claim 2, wherein said shaft includes a third stop segment defined by a fifth shaft section that is mounted between said second shaft section and said fourth shaft section.

6. The ACM as recited in claim 5, including a compressor mounted on said shaft adjacent said third stop segment.

7. The ACM as recited in claim 5, wherein at least one of said first shaft section, said second shaft section, said third shaft section, said fourth shaft section, or said fifth shaft section are hollow.

8. The ACM as recited in claim 1, wherein said shaft includes an internal cavity.

9. The ACM as recited in claim 1, wherein said second shaft section includes a journal bearing surface.

10. An air cycle machine (ACM) comprising:
a shaft formed from a plurality of shaft sections including at least a first shaft section having a first shaft section diameter and a second shaft section having a second shaft section diameter that is greater than said first shaft section diameter, wherein said plurality of shaft sections are connected by at least one welded joint;
a first turbine mounted on said shaft;
a second turbine mounted on said shaft; and
a compressor mounted on said shaft between said first turbine and said second turbine.

11. The ACM as recited in claim 10, wherein said plurality of shaft sections are electron-beam welded together.

12. The ACM as recited in claim 10, wherein at least one of said plurality of shaft sections is hollow.

13. The ACM as recited in claim 10, wherein said shaft includes an internal cavity.

14. The ACM as recited in claim 10, wherein said shaft includes first and second journal bearing surfaces that support radial loads on said shaft.

15. The ACM as recited in claim 14, wherein said shaft includes a radially extending flange between said first and second journal bearing surfaces that supports axial loads on said shaft.

16. The ACM as recited in claim 10, wherein said shaft includes a first stop, a second stop, and a third stop that secure, respectively, said first turbine, said second turbine, and said compressor on said shaft.

17. The ACM as recited in claim 7, wherein said first shaft section, said second shaft section, said third shaft section, said fourth shaft section, and said fifth shaft section are hollow.

18. The ACM as recited in claim 1, wherein a first stop segment diameter is the same as said second shaft section diameter.

19. The ACM as recited in claim 1, wherein the first stop segment is bonded to the first shaft section and the second shaft section at each end.

20. The ACM as recited in claim 5, wherein said third stop segment includes a third axially facing surface facing away from said fourth shaft section.

21. The ACM as recited in claim 5, wherein said fifth shaft section includes a threaded portion.

\* \* \* \* \*